United States Patent
Dillon et al.

(10) Patent No.: US 12,543,624 B2
(45) Date of Patent: Feb. 10, 2026

(54) SEEDBED PREPARATION METHOD AND MECHANISM

(71) Applicant: Tribine Industries LLC, Logansport, IN (US)

(72) Inventors: Ben N. Dillon, Logansport, IN (US); Dillon M. Thompson, Burdett (UA)

(73) Assignee: Tribine Industries LLC, Logansport, IN (US)

( * ) Notice: Subject to any disclaimer, the term of this patent is extended or adjusted under 35 U.S.C. 154(b) by 680 days.

(21) Appl. No.: 17/938,156

(22) Filed: Oct. 5, 2022

(65) Prior Publication Data

US 2023/0104234 A1 Apr. 6, 2023

Related U.S. Application Data

(60) Provisional application No. 63/262,099, filed on Oct. 5, 2021.

(51) Int. Cl.
| | |
|---|---|
| *A01C 5/06* | (2006.01) |
| *A01B 49/06* | (2006.01) |
| *A01C 7/00* | (2006.01) |

(52) U.S. Cl.
CPC .............. *A01C 5/064* (2013.01); *A01B 49/06* (2013.01); *A01C 5/068* (2013.01); *A01C 7/006* (2013.01)

(58) Field of Classification Search
CPC ........... A01C 5/064; A01C 5/062; A01C 5/06; A01C 5/00; A01C 5/068; A01C 5/066; A01C 7/006; A01C 7/00; A01B 49/06; A01B 49/04; A01B 49/00
See application file for complete search history.

(56) References Cited

U.S. PATENT DOCUMENTS

| | | | |
|---|---|---|---|
| 1,509,403 | A | 9/1924 | Howard et al. |
| 2,174,136 | A | 9/1939 | Patty |
| 2,749,696 | A | 6/1956 | Innes |
| 3,680,291 | A | 8/1972 | Soteropulos |
| 3,717,272 | A | 2/1973 | Chartier et al. |
| 4,317,326 | A | 3/1982 | Riedinger |
| 4,411,581 | A | 10/1983 | Niewold |
| 4,414,794 | A | 11/1983 | Riedinger |
| 4,415,303 | A | 11/1983 | Westendorf et al. |
| 4,565,257 | A | 1/1986 | Hanson |
| 4,583,905 | A | 4/1986 | Scherr |

(Continued)

FOREIGN PATENT DOCUMENTS

| | | |
|---|---|---|
| DE | 4325469 | 2/1995 |
| WO | 2006074667 | 7/2006 |

OTHER PUBLICATIONS https://www.yetterco.com/products/11-plantermount-row-cleaners, "2967 Screw Adjust Row Cleaner", Aug. 31, 2021.

(Continued)

*Primary Examiner* — Christopher J. Novosad
(74) *Attorney, Agent, or Firm* — Emerson, Thomson & Bennett, LLC; Roger D. Emerson; Peter R. Detorre

(57) ABSTRACT

A seedbed preparation and planting machine includes a cutting assembly including powered forward cutting blades for chopping crop residue. A cutting disc assembly follows the cutting assembly effective for forming a seedbed trench at a seed planting depth. A seed assembly follows the cutting disc assembly including a seed hopper and a seed tube located to drop seed into the seedbed trench. A packer assembly tamps down seed in the seedbed trench for covering seed therein.

21 Claims, 7 Drawing Sheets

(56) References Cited

U.S. PATENT DOCUMENTS

| | | |
|---|---|---|
| 4,590,739 A | 5/1986 | Abatti et al. |
| 4,720,119 A | 1/1988 | Ritter |
| 4,768,802 A | 9/1988 | Winkler |
| 5,244,226 A | 9/1993 | Bergh |
| 5,417,299 A | 5/1995 | Pillar et al. |
| 5,904,365 A | 5/1999 | Dillon |
| 6,012,272 A | 1/2000 | Dillon |
| 6,125,618 A | 10/2000 | Dillon |
| 6,233,911 B1 | 5/2001 | Dillon |
| 6,339,917 B1 | 1/2002 | Dillon et al. |
| 6,484,485 B2 | 11/2002 | Dillon |
| 6,604,995 B2 | 8/2003 | Dillon |
| 6,606,844 B2 | 8/2003 | Dillon |
| 6,910,845 B2 | 6/2005 | Dillon |
| 7,143,863 B2 | 12/2006 | Dillon |
| 7,553,228 B2 | 6/2009 | Dillon |
| RE42,036 E | 1/2011 | Dillon |
| 8,286,984 B2 | 10/2012 | Dillon |
| 8,292,008 B2 | 10/2012 | Dillon |
| 8,435,104 B2 | 5/2013 | Dillon |
| 9,723,773 B2 | 8/2017 | Jordan |
| 9,901,030 B2 | 2/2018 | Matousek et al. |
| 10,231,371 B2 | 3/2019 | Dillon |
| 10,244,685 B2 | 4/2019 | Matousek et al. |
| 10,257,977 B2 | 4/2019 | Nelson et al. |
| 10,492,363 B2 | 12/2019 | Matousek et al. |
| 10,849,276 B2 | 12/2020 | Matousek et al. |
| 2002/0011057 A1 | 1/2002 | Dillon |
| 2010/0267432 A1 | 10/2010 | Roberge et al. |
| 2014/0262370 A1 | 9/2014 | Kohn et al. |
| 2017/0142901 A1 | 5/2017 | Herrman et al. |
| 2018/0051513 A1 | 2/2018 | Matousek et al. |
| 2019/0350124 A1 | 11/2019 | Pitt |
| 2020/0100418 A1 | 4/2020 | Kornecki et al. |
| 2021/0127552 A1 | 5/2021 | Hubner et al. |
| 2023/0104234 A1 | 4/2023 | Dillon et al. |
| 2024/0114830 A1 | 4/2024 | Dillon et al. |

OTHER PUBLICATIONS

International Search Report and Written Opinion for PCT App. No. PCT/US23/72687 mailed Dec. 14, 2023.

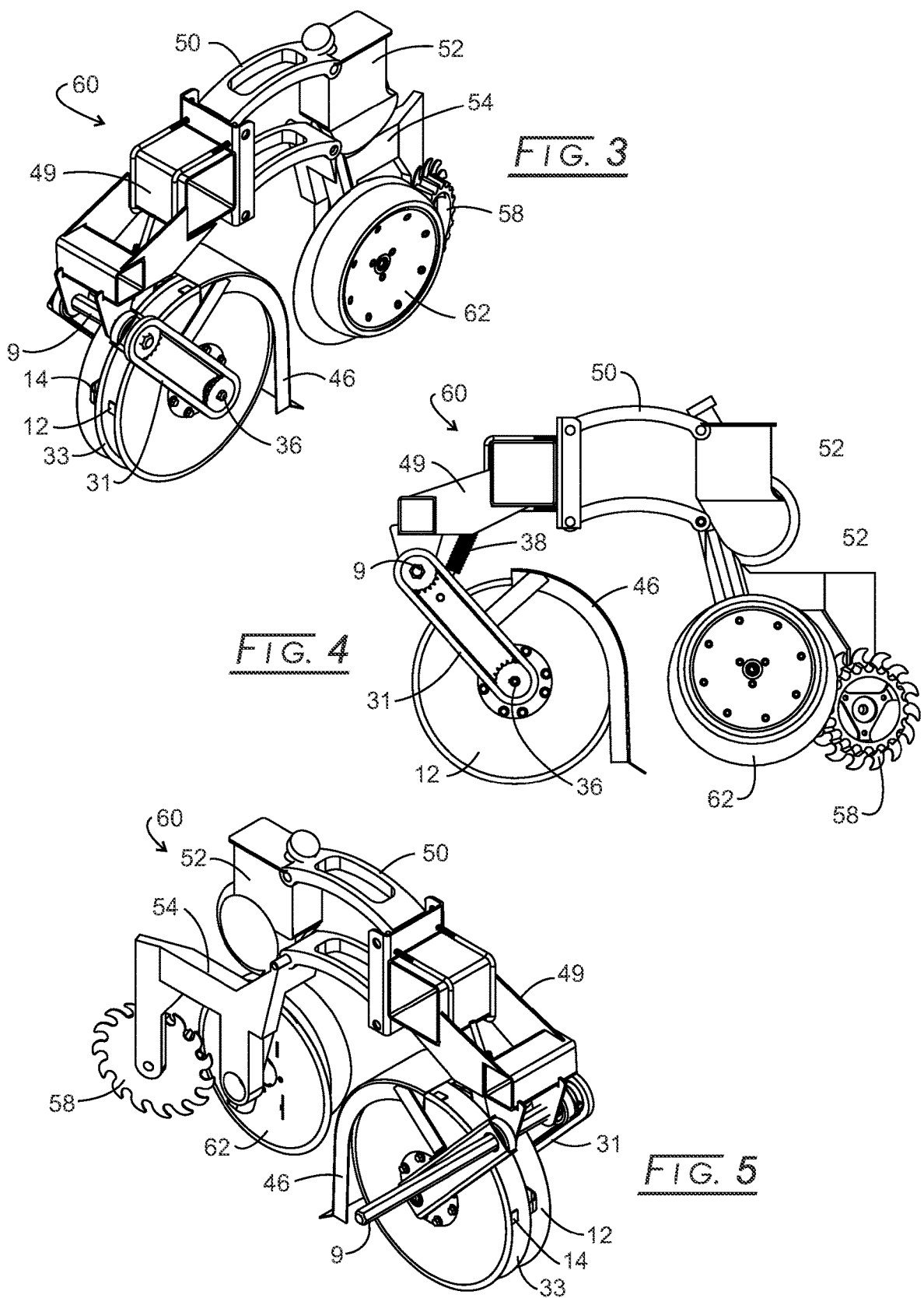

SEEDBED PREPARATION METHOD AND MECHANISM

CROSS-REFERENCE TO RELATED APPLICATIONS

This application claims benefit of provisional application 63/262,099 filed on Oct. 13, 2021.

STATEMENT REGARDING FEDERALLY SPONSORED RESEARCH AND DEVELOPMENT

Not applicable.

THE NAMES OF THE PARTIES TO A JOINT RESEARCH AGREEMENT

Not applicable.

REFERENCE TO A "SEQUENCE LISTING," A TABLE, OR A COMPUTER PROGRAM

Not applicable.

STATEMENT REGARDING PRIOR DISCLOSURES BY THE INVENTOR OR A JOINT INVENTOR

Not applicable.

BACKGROUND OF THE INVENTION

The present disclosure relates to farming in general and more particularly to an improved tillage method.

It is desirable to facilitate carbon sequestration and increase the organic matter in the soil by reducing tillage and the number of trips across the field by tractors and implements to grow and harvest a crop.

Row clearing devices that are only powered by ground contact tend not to be able to cope with heavy residue and stop rotating and plug up with residue. This requires the operator to stop the machine and clean out the plug of residue and soil. Seedbed preparation devices driven only by ground contact generally do not generate enough torque to chop heavy crop residue, such as corn stalks.

It is to this problem that the present invention is addressed.

BRIEF SUMMARY OF THE INVENTION

This invention has elements that are ground driven by engaging the soil passing under the machine. It also has elements that are powered by a mobile source moving with the machine. This provides the ability to engage the soil and residue at a speed directly proportional to the velocity over the ground of the machine and simultaneously engage the soil and residue at speeds different than ground speed of the machine.

This invention is directed towards these two objectives. It prepares the seedbed for planting crops during the same process and trip across the field that is planting the seeds in the ground to germinate and grow. It also effectively deals with heavy residue left on the ground from the previously harvested crop, such as corn, by clearing residue from a narrow path for the new crop to be planted. The residue is both chopped into smaller pieces and pushed aside from the new seedbed. As only one example the new seedbed may be in the range of, say, for example, 100 millimeters wide.

In the preferred embodiment, a single thin ground powered cutting disc oriented to cut longitudinally is located centrally on the same shaft as two adjacent mechanically powered rotating cutting blades that are shaped to fluff the soil that will be the seedbed and chop residue still in its path while also moving it aside. The cutting disc ensures that any residue disposed generally across the projected path of the new seedbed is cut at least once before it is encountered by the chopping blades. The cutting disc penetrates the soil to a depth greater than the chopping blades and the intended depth of the crop seed. The chopping blades penetrate the soil to a depth greater than the intended depth of the seed placement. The operating depth of the seedbed preparation mechanism is independent of the operating depth in the soil of the seed placement mechanism.

BRIEF DESCRIPTION OF THE SEVERAL VIEWS OF THE DRAWINGS

For a fuller understanding of the nature and advantages of the present method and process, reference should be had to the following detailed description taken in connection with the accompanying drawings, in which:

FIG. 3 is an isometric view of the disclosed machine from its front;

FIG. 4 is a side elevational view of the machine;

FIG. 5 is an isometric view of the disclosed machine from its rear;

The drawings will be described in more detail below.

DETAILED DESCRIPTION OF THE INVENTION

The new seedbed preparation mechanism consists of one or more ground powered residue cutting discs and one or more rotating cutting blades powered by a rotating shaft which is in turn powered by a source other than ground contact, that is, a second power source.

Figure 1:
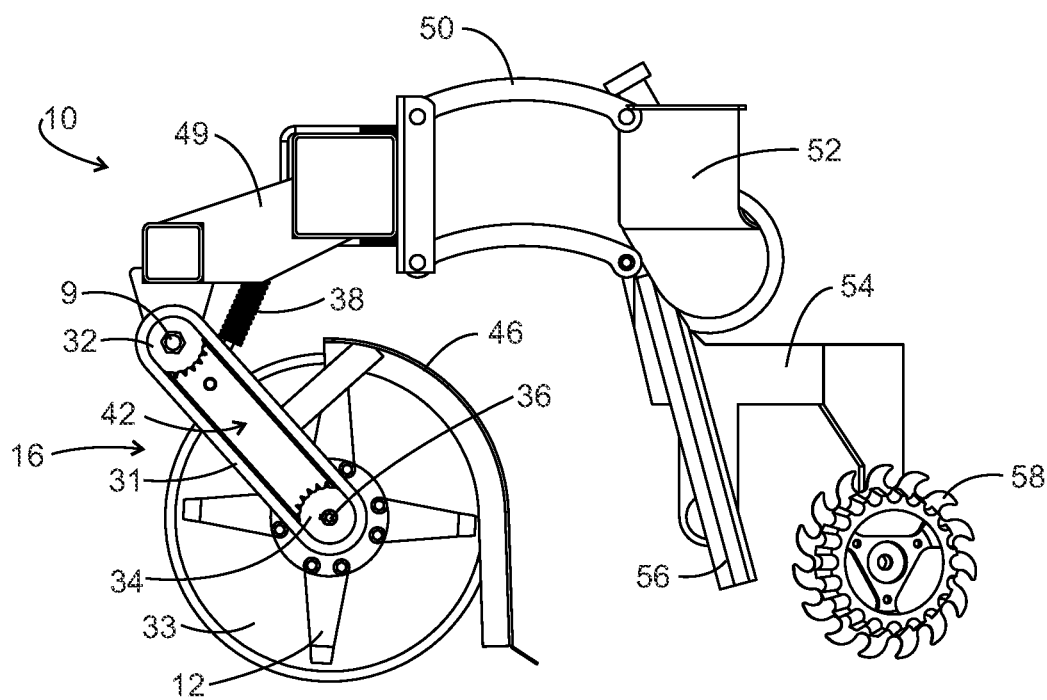
FIG. 1 is a is a side view of the seedbed preparation and planting machine.
Figure 2:
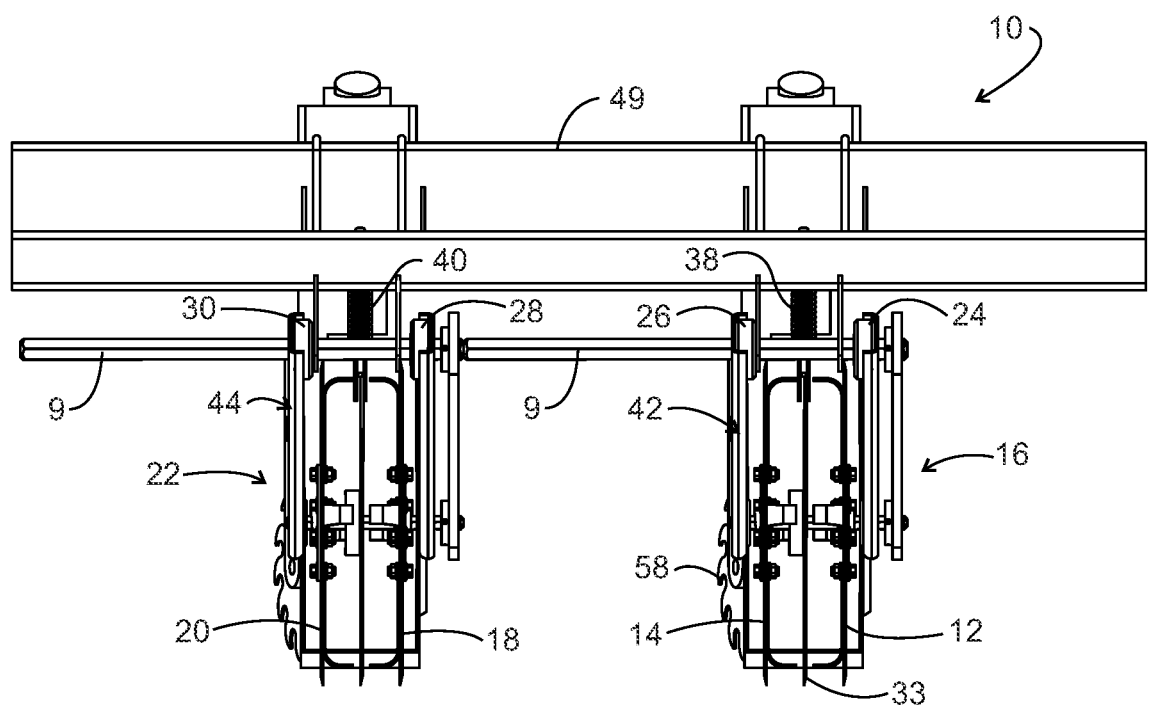
FIG. 2 is front elevational view of the seedbed preparation and planting machine.

Referring initially to FIGS. 1 and 2, a seedbed preparation machine, 10, has the ability to cut up crop residue, such as, for example, corn stalks, and to plant a new crop, such as, for example, a cover crop. In agriculture, cover crops are plants that are planted to cover the soil rather than for the purpose of being harvested. Cover crops manage soil erosion, soil fertility, soil quality, water, weeds, pests, diseases, biodiversity, and wildlife in an agroecosystem—an ecological system managed and shaped by humans. Cover crops may be an off-season crop planted after harvesting a cash crop. Machine 10 includes forward cutting blades with discs, 12 and 14, in a cutting assembly, 16, and cutting blades with discs, 18 and 20 (FIG. 2), in a cutting assembly, 22. Each cutting blade generally is a C-shape; although, other shapes may find advantage is machine 10. The details of cutting assemblies 16 and 22 will be illustrated with particular reference to cutting assembly 16; although, it will be recognized that cutting assembly 22 contains congruous parts.

While each cutting blade may be powered by its own power source. The drawings show a rotating bar, 9, that rotates within bearing assemblies, 24, 26, 28 and 30 for cutting wheels 12, 14, 18, and 20, respectively. The rotating bar 9 drives a chain assembly, 31, including a pair of sprockets, 32 and 34, which transfer motion to an axle, 36, that causes rotation of cutting blade 12, and a ground powered disc, 33, that carries the sprockets. Spring assemblies, 38 and 40, provide downward force for cutting assemblies 16 and 18, respectively. Spring assemblies 38 and 40 in turn are attached to pivot assemblies, 42 and 44, respectively, which pivot assemblies are carried by chain assembly 31. Cutting assembly 16 further includes a hood, 46, to shield dirt and debris tossed up by cutting blade 12. All other cutting assemblies are powered in this Manner.

Cutting assemblies 16 and 22 are carried by a structural assembly, 49, typically made of steel, which in turn is attached to a parallel link arm assembly, 50, which is attached to a seed hopper assembly, 52. Link arm assembly 50 also is attached to another structural assembly, 54, that provides support for a seed hopper assembly 52. Seed hopper assembly 52 feeds a seed tube, 56, that drops crop seed onto the ground for planting. Also carried by structural assembly 54 is a closing wheel/packer wheel assembly, 58, that cuts a planting trench and assists the crop seeds to fall down thereinto for growth in a crop. Another wheel/packer assembly, 59, can be seen in FIG. 7.

Figure 6:
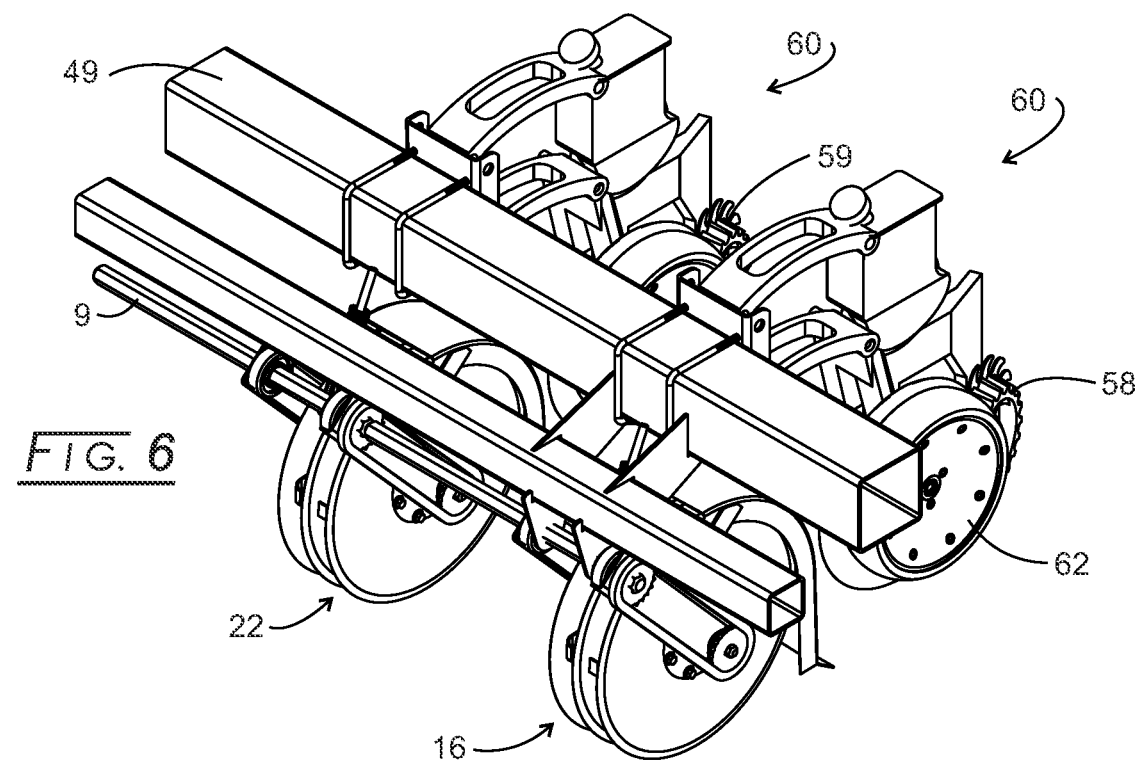
FIG. 6 is an isometric view from the front of a pair of the machines laterally aligned.
Figure 7:
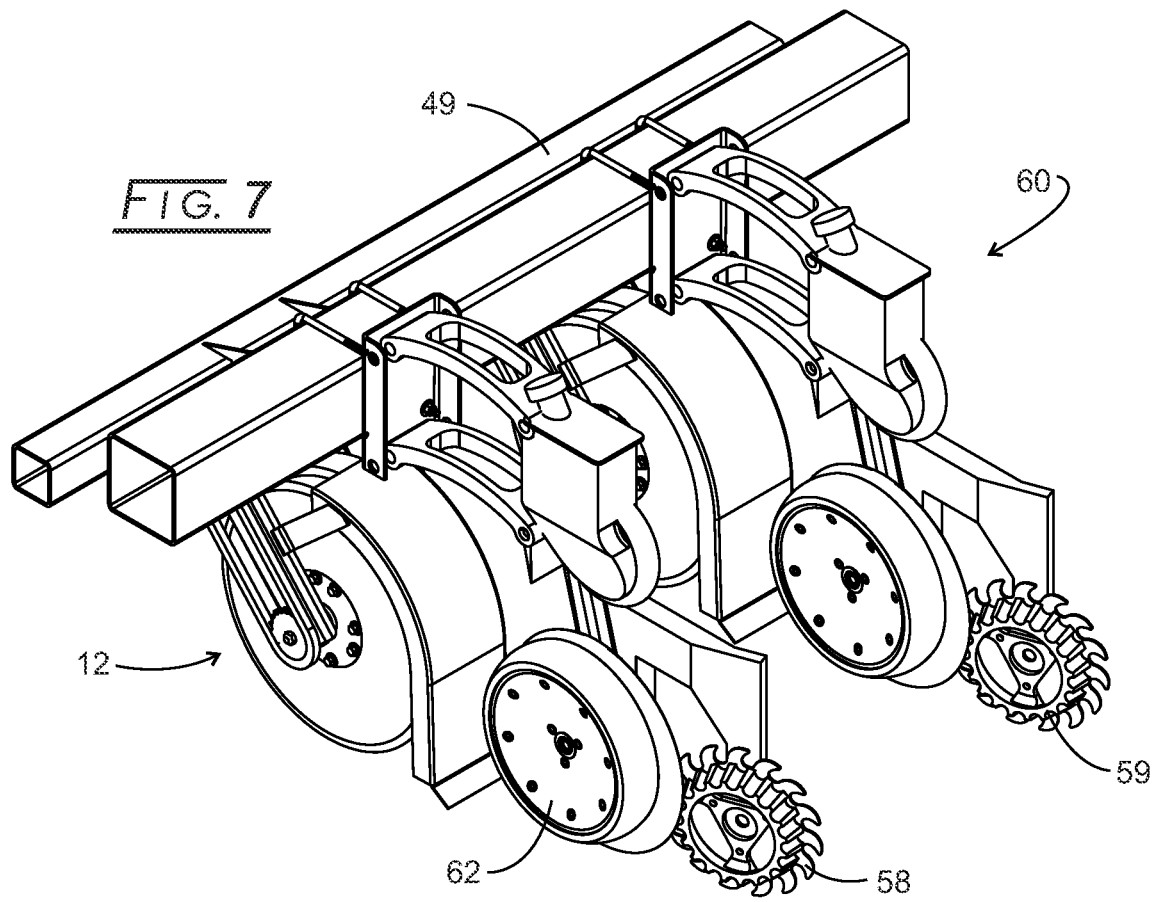
FIG. 7 is an isometric view from the rear of a pair of the machines laterally aligned.

Referring now to FIGS. 3-6, a modified machine, 60, carries the same cutting/planting assembly as described above along with closing wheel/packer wheel assembly 58, but also has a disc assembly, 62, for creating a seed trench into which seed tube 56 feeds seed. FIGS. 6 and 7 show a pair of assemblies, as illustrated in FIGS. 3-6, adjacent to each other. The number of such assemblies is a design choice for the manufacturer of such machines.

Figure 8:
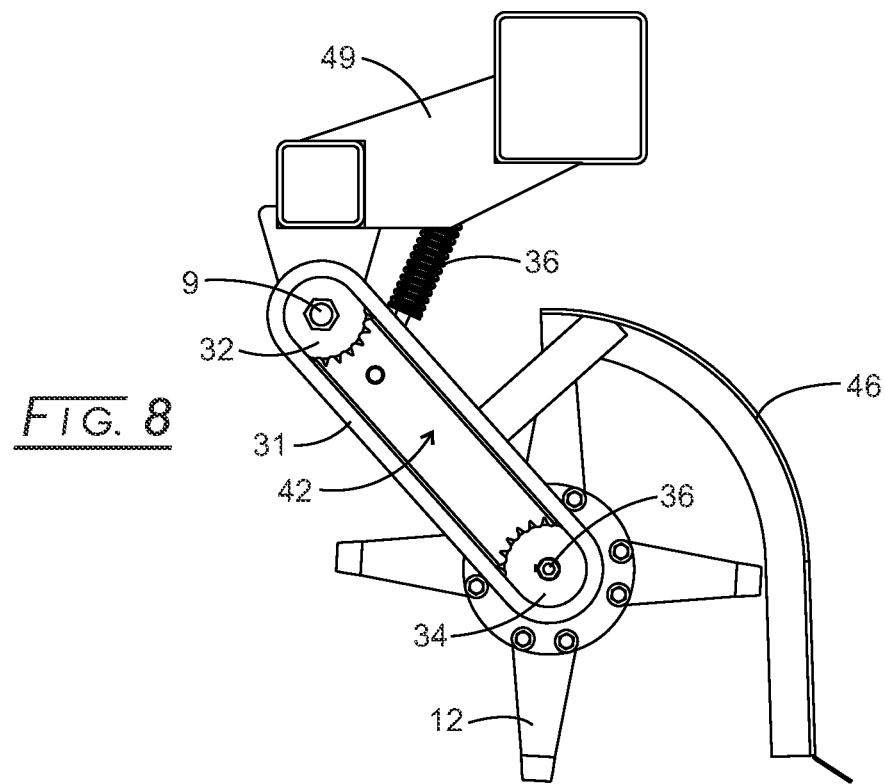
FIG. 8 is a side elevational view of a representative cutting assembly of the disclosed machine with the discs removed.
Figure 9:
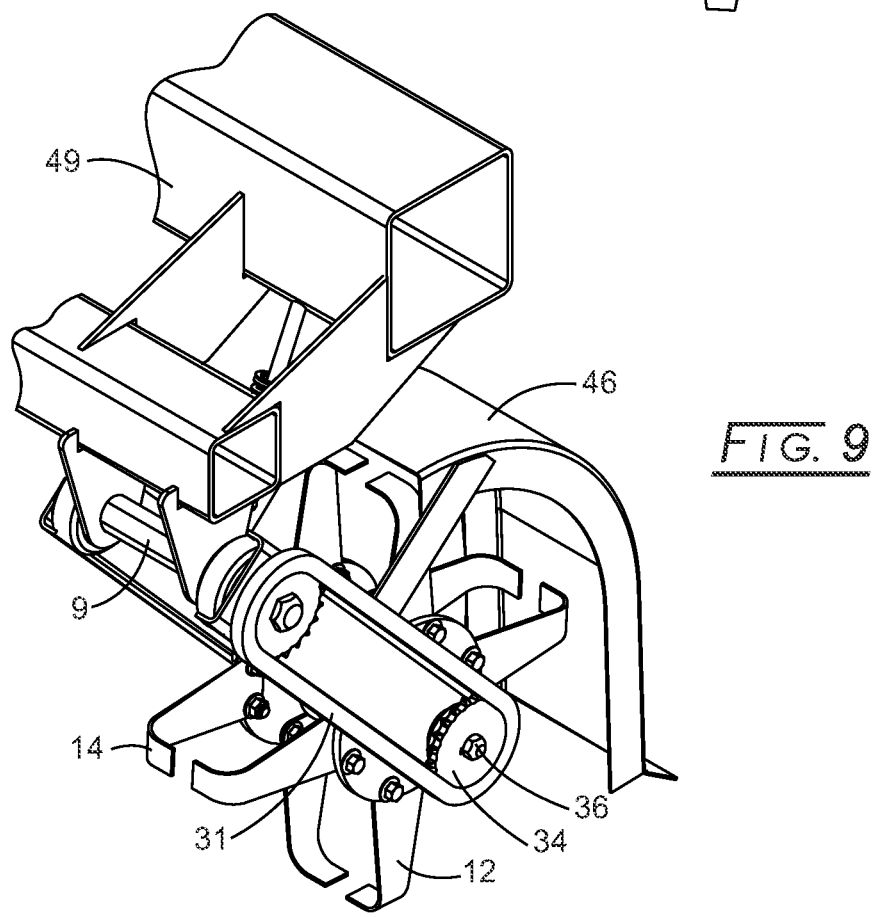
FIG. 9 is an isometric view from the front of the cutting assembly with the discs removed.

Referring now to FIGS. 8 and 9, components have been stripped away to reveal cutting mechanism 16 in more detail. Here sprockets 32 and 36 are seen to be rotated/driven by belt 31 while spring (biasing member) 38 permits the cutting assembly to move vertically over the (often) uneven terrain of fields while still maintaining downward pressure on the cutting mechanism.

Figure 10:
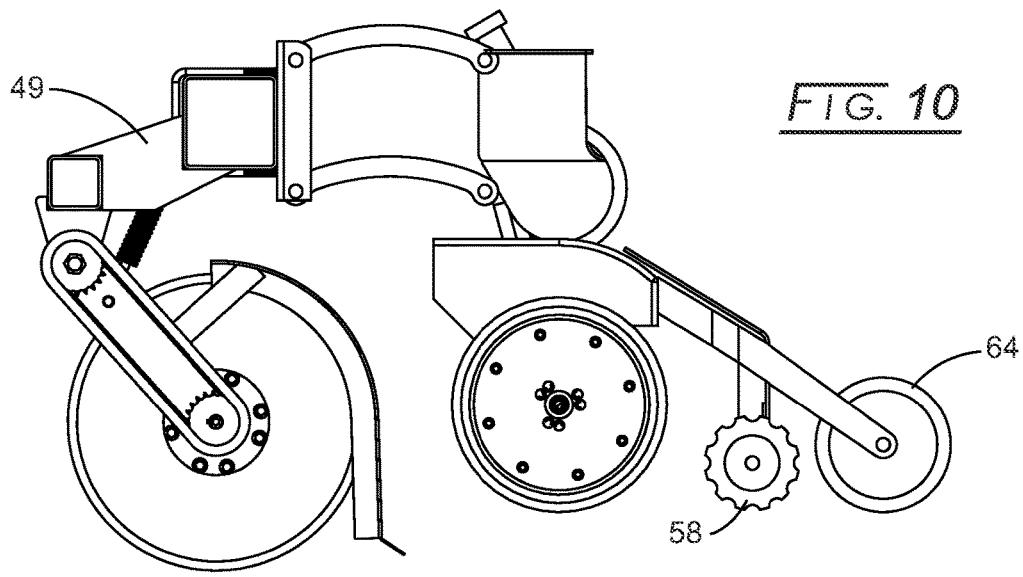
FIG. 10 is a side elevational view of another embodiment of the machine having a trailing closing/packer wheel assembly.
Figure 11:
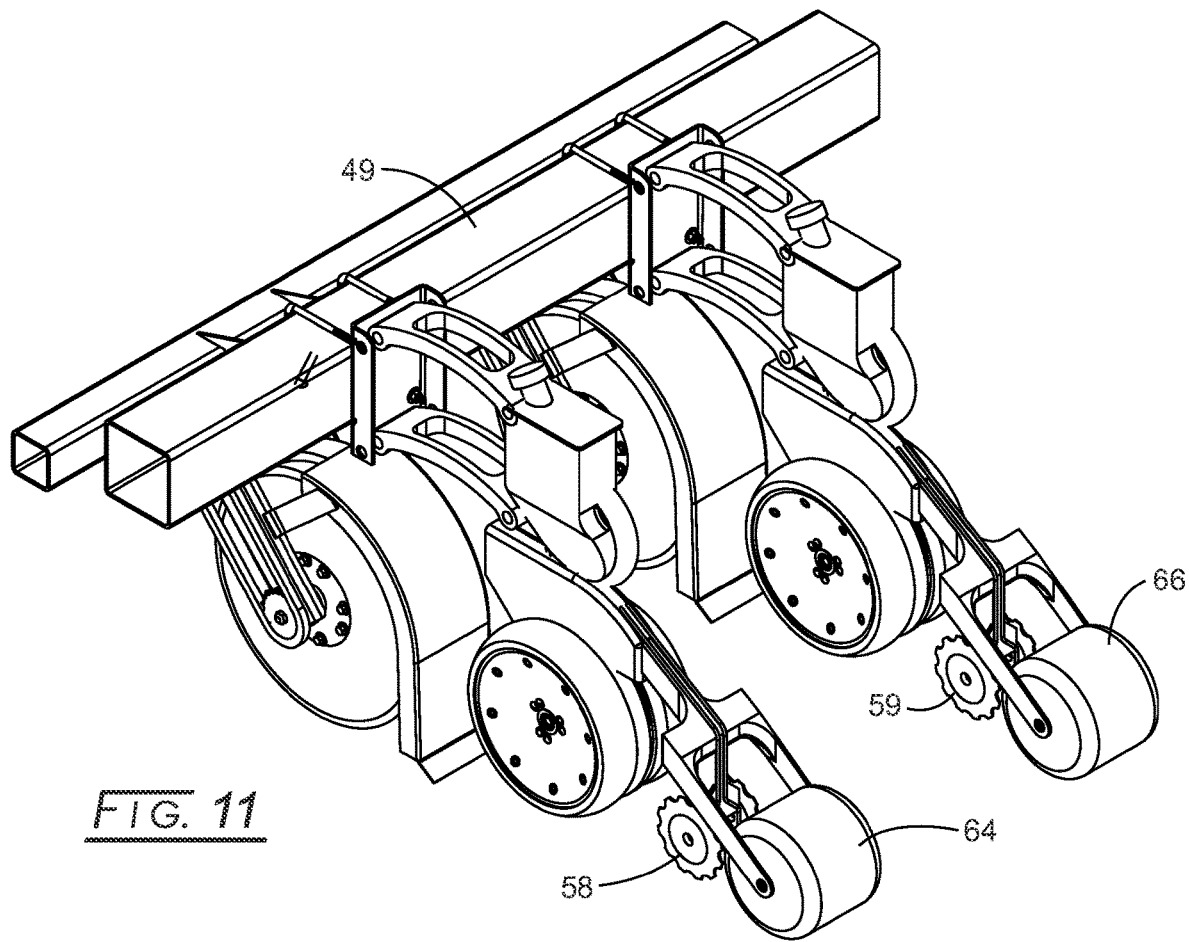
FIG. 11 is an isometric view from is rear of the machine of FIG. 10.

Referring now to FIGS. 10 and 11, roller assemblies, 64 and 66, follow wheel packer assemblies 58 and 59. Roller assemblies 64 and 66 can move over the seeded trenches for moving soil atop the seeds in the trench.

Figure 12:
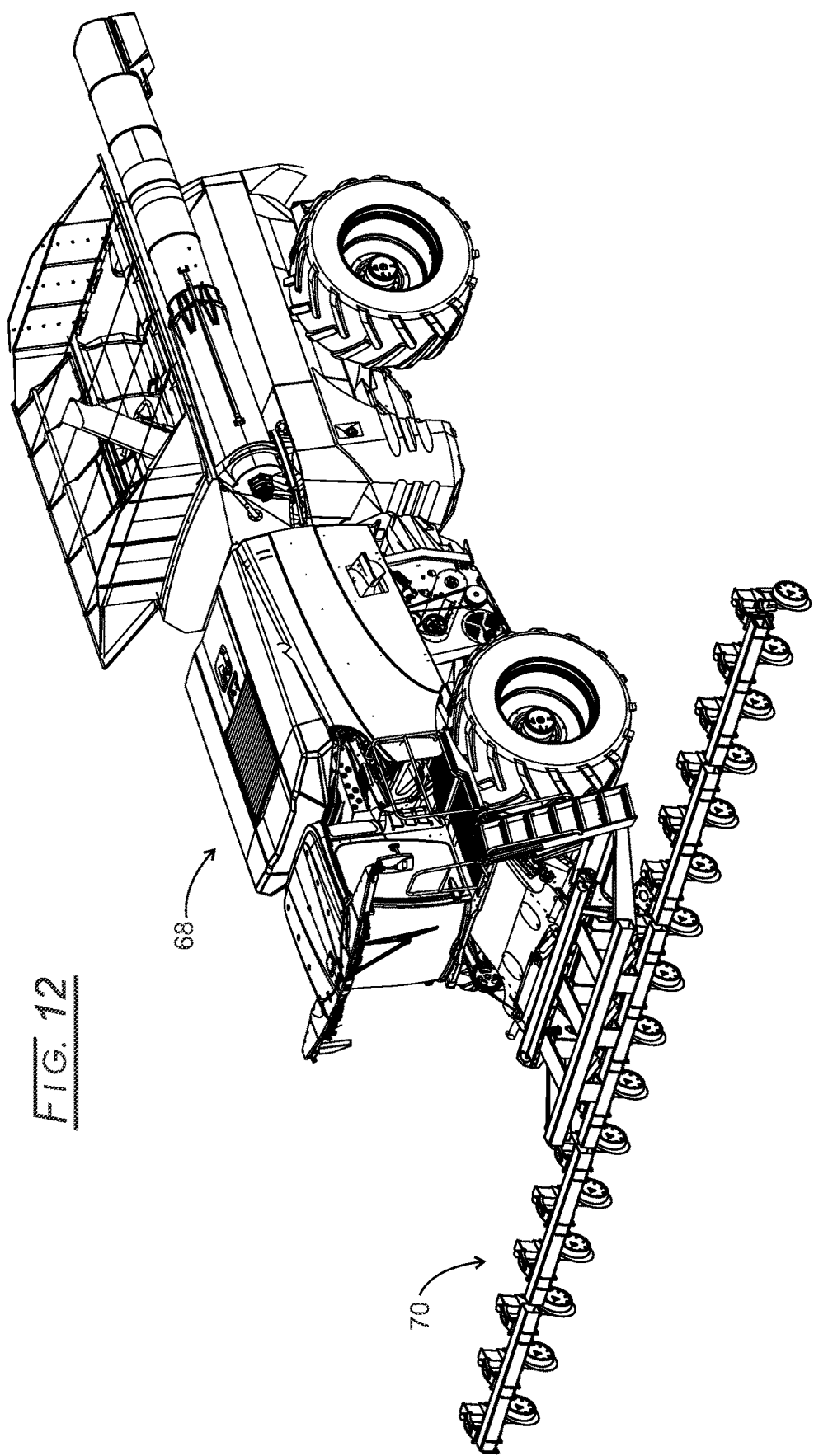
FIG. 12 is an isometric view of a harvester carrying a crophead for harvesting crop with laterally aligned planters carried immediately behind the crophead.
Figure 13:
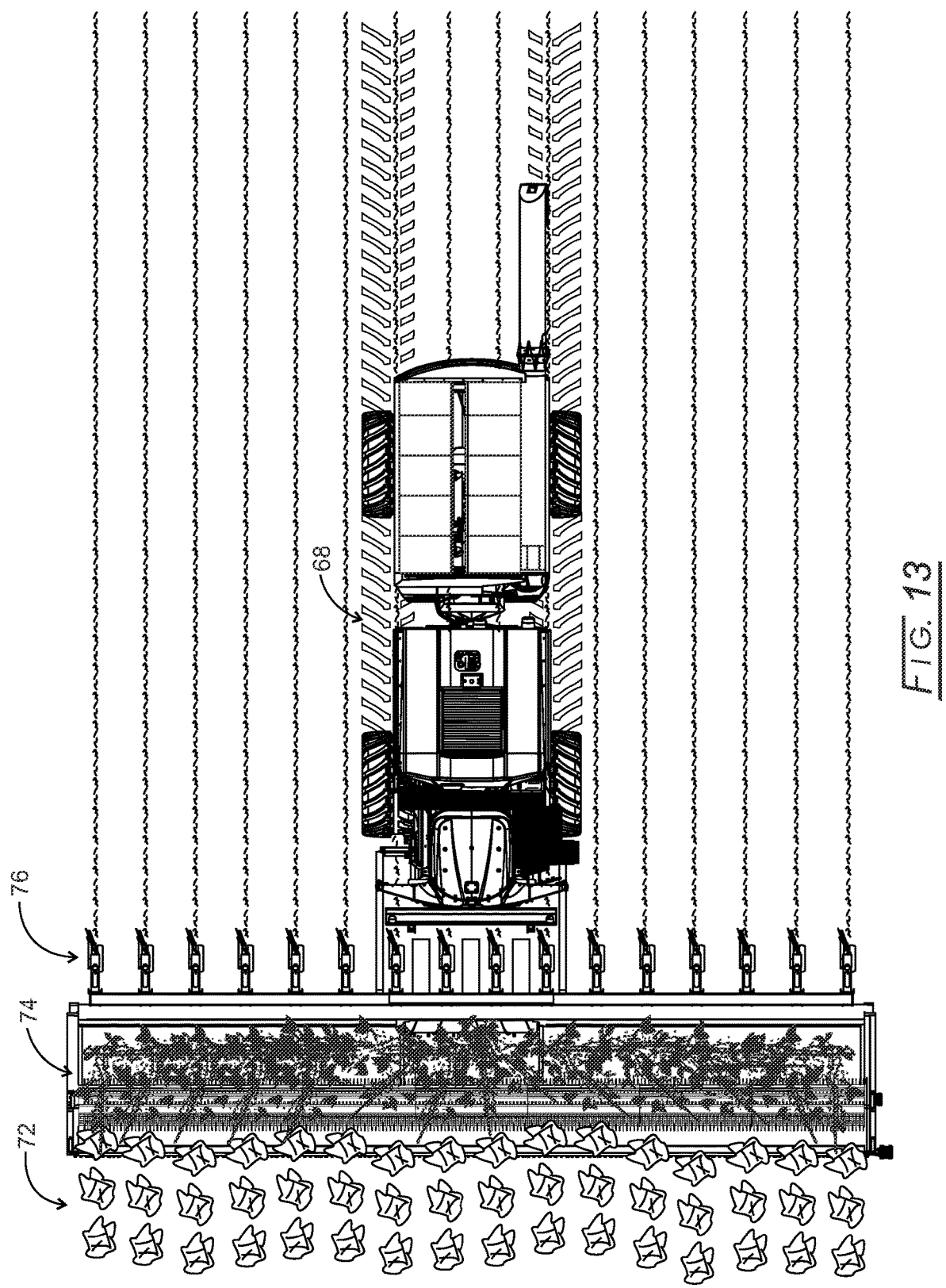
FIG. 13 is an overhead view of the harvester of FIG. 12 in a field harvesting crop and planting a cover crop.

FIG. 12 shows a harvester, 68, carrying a gang, 70, of the disclosed cutting assemblies in adjacency spanning perpendicular to the direction of travel of harvester 68. This configuration can be used to traverse a fallow field or a field where a crop has already been harvested in order to plant a crop, field or cash. Of course, as has already been stated, a conventional harvesting head can be combined with the cutting assemblies disclosed herein, as is illustrated in FIG. 13. Harvester 68 is seen carrying a forward cutting head, 74, that is harvesting a soybean crop, 72, for example. A gang of the novel cutting heads, 76, has been mounted immediately behind cutting head 74. In this configuration, a single harvester can harvest a first crop while planting seeds of a second crop using a single forwardly mounted dual head.

While the apparatus, system, and method have been described with reference to various embodiments, those skilled in the art will understand that various changes may be made and equivalents may be substituted for elements thereof without departing from the scope and essence of the disclosure. In addition, many modifications may be made to adapt a particular situation or material in accordance with the teachings of the disclosure without departing from the essential scope thereof. Therefore, it is intended that the disclosure not be limited to the particular embodiments disclosed, but that the disclosure will include all embodiments falling within the scope of the appended claims. In this application all units are in the metric system and all amounts and percentages are by weight, unless otherwise expressly indicated. Also, all citations referred herein are expressly incorporated herein by reference.

The invention claimed is:

1. A seedbed preparation and planting machine, which comprises:
   (a) a cutting assembly including powered forward cutting blades for chopping crop residue, wherein the cutting assembly comprises a chain assembly and a biasing member, wherein the biasing member has a first end and a second end, wherein the first end of the biasing member is engaged with a structural assembly and the second end of the biasing member is engaged with a pivot assembly carried by the chain assembly;
   (b) a cutting disc assembly following the cutting assembly effective for forming a seedbed trench at a seed planting depth;
   (c) a seed assembly following the cutting disc assembly including a seed hopper and a seed tube located to drop seed into the seedbed trench; and
   (d) a packer assembly for tamping down seed in the seedbed trench for covering seed therein.

2. The seedbed preparation and planting machine of claim 1, which is towed by a towing vehicle and which seedbed preparation and planting machine is powered independently of the towing vehicle.

3. The seedbed preparation and planting machine of claim 1, which carries a series of the powered forward cutting blades connected for rotating in unison.

4. The seedbed preparation and planting machine of claim 1, which is carried by an agricultural harvester at a front end or at a rear end thereof.

5. The seedbed preparation and planting machine of claim 4, wherein the agricultural harvester carries a forward harvesting assembly for harvesting a planted crop where the seedbed preparation and planting machine is carried by the forward harvesting assembly at its back side.

6. The seedbed preparation and planting machine of claim 4, wherein the agricultural harvester carries a forward harvesting assembly for harvesting a planted crop wherein the seedbed preparation and planting machine is carried by the agricultural harvester at its rear side.

7. The seedbed preparation and planting machine of claim 5, wherein the forward harvesting assembly utilizes a plurality of individual cutting heads, wherein a seedbed preparation and planting machine is located in alignment with each cutting head.

8. A method for planting a cover crop in a crop field, which comprises the steps of:

moving a seedbed preparation and planting machine across the crop field after the crop has been harvested, wherein the seedbed preparation and planting machine comprises:

(a) a cutting assembly including powered forward cutting blades for chopping crop residue, wherein the cutting assembly comprises a chain assembly and a biasing member, wherein the biasing member has a first end and a second end, wherein the first end of the biasing member is engaged with a structural assembly and the second end of the biasing member is engaged with a pivot assembly carried by the chain assembly;

(b) a cutting disc assembly following the cutting assembly effective for forming a seedbed trench at a seed planting depth;

(c) a seed assembly following the cutting disc assembly including a seed hopper and a seed tube located to drop seed into the seedbed trench; and (d) a packer assembly for tamping down seed in the seedbed trench for covering seed therein.

9. The method of claim 8, including towing the seedbed preparation and planting machine with a towing vehicle which is powered independently of the towing vehicle.

10. The method of claim 8, wherein a series of the powered forward cutting blades connected for rotating together are carried by the seedbed preparation and planting machine.

11. The seedbed preparation and planting machine of claim 8, which is carried by an agricultural harvester at a front end or at a rear end thereof.

12. The method of claim 11, wherein the agricultural harvester carries a forward harvesting assembly for harvesting a planted crop where the seedbed preparation and planting machine is carried by the forward assembly at its back side.

13. The method of claim 11, wherein the agricultural harvester carries a forward harvesting assembly for harvesting a planted crop wherein the seedbed preparation and planting machine is carried by the agricultural harvester at its rear side.

14. The method of claim 12, wherein the forward harvesting assembly utilizes a plurality of individual cutting heads, wherein a seedbed preparation and planting machine is located in alignment with each cutting head.

15. A seedbed preparation and planting machine, which comprises:

(a) a cutting assembly including powered forward cutting blades for chopping crop residue, wherein the cutting assembly is carried by a first structural assembly;

(b) a cutting disc assembly following the cutting assembly effective for forming a seedbed trench at a seed planting depth;

(c) a seed assembly following the cutting disc assembly including a seed hopper and a seed tube located to drop seed into the seedbed trench, wherein the seed assembly comprises a second structural assembly that provides support for the seed hopper;

(d) a packer assembly for tamping down seed in the seedbed trench for covering seed therein, wherein the packer assembly is carried by the second structural assembly; and, (e) a parallel link arm assembly having a first end and a second end, wherein the first end of the parallel link arm assembly is attached to the first structural assembly and the second end of the parallel link arm assembly is attached to the second structural assembly thereby connecting the cutting assembly carried by the first structural assembly to the seed assembly carried by the second structural assembly.

16. The seedbed preparation and planting machine of claim 15, which is towed by a towing vehicle and which seedbed preparation and planting machine is powered independently of the towing vehicle.

17. The seedbed preparation and planting machine of claim 15, which carries a series of the powered forward cutting blades connected for rotating in unison.

18. The seedbed preparation and planting machine of claim 15, which is carried by an agricultural harvester at a front end or at a rear end thereof.

19. The seedbed preparation and planting machine of claim 18, wherein the agricultural harvester carries a forward harvesting assembly for harvesting a planted crop where the seedbed preparation and planting machine is carried by the forward harvesting assembly at its back side.

20. The seedbed preparation and planting machine of claim 19, wherein the forward harvesting assembly utilizes a plurality of individual cutting heads, wherein a seedbed preparation and planting machine is located in alignment with each cutting head.

21. The seedbed preparation and planting machine of claim 18, wherein the agricultural harvester carries a forward harvesting assembly for harvesting a planted crop wherein the seedbed preparation and planting machine is carried by the agricultural harvester at its rear side.

\* \* \* \* \*